US012567991B2

(12) United States Patent
Aladawy et al.

(10) Patent No.: US 12,567,991 B2
(45) Date of Patent: Mar. 3, 2026

(54) METHOD, DEVICE, COMPUTER PROGRAM, AND COMPUTER-READABLE STORAGE MEDIUM FOR DETERMINING A NEURAL NETWORK AND FOR OPERATING A VEHICLE

(71) Applicant: Bayerische Motoren Werke Aktiengesellschaft, Munich (DE)

(72) Inventors: Dina Khaled Saber Amin Aladawy, Munich (DE); Bernhard Schlegel, Munich (DE); Philipp Reinisch, Kirchseeon (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 688 days.

(21) Appl. No.: 17/922,956

(22) PCT Filed: Mar. 31, 2021

(86) PCT No.: PCT/EP2021/058394
§ 371 (c)(1),
(2) Date: Nov. 2, 2022

(87) PCT Pub. No.: WO2021/254672
PCT Pub. Date: Dec. 23, 2021

(65) Prior Publication Data
US 2023/0169310 A1 Jun. 1, 2023

(30) Foreign Application Priority Data
Jun. 18, 2020 (DE) ..................... 10 2020 116 054.2

(51) Int. Cl.
*H04L 12/40* (2006.01)
*G06N 3/045* (2023.01)
*G06N 3/08* (2023.01)

(52) U.S. Cl.
CPC ............. *H04L 12/40* (2013.01); *G06N 3/045* (2023.01); *G06N 3/08* (2013.01)

(58) Field of Classification Search
CPC ................................ H04L 12/40; G06N 3/045
See application file for complete search history.

(56) References Cited

U.S. PATENT DOCUMENTS

2020/0120131 A1 4/2020 Soni et al.

FOREIGN PATENT DOCUMENTS

DE 102017210787 A1 12/2018
DE 102017213119 A1 1/2019
(Continued)

OTHER PUBLICATIONS

Lokman, Intrusion Detection System For Automotive Controller Area Network (CAN) Bus System: A Review, pp. 1-17, (Year: 2019).*

(Continued)

*Primary Examiner* — Albert M Phillips, III
(74) *Attorney, Agent, or Firm* — Maginot, Moore & Beck LLP

(57) ABSTRACT
A method, and a corresponding device and computer, determine a neural network configured to process temporal dependencies. The method includes providing input training data that comprises identification information of messages of a vehicle bus of a vehicle and information with respect to time intervals between the messages. The messages were transmitted in a first predetermined time period via the vehicle bus. The method also includes providing output training data that is representative of a bus load of the vehicle bus in a second predetermined time period, wherein the second predetermined time period is arranged temporally after the first predetermined time period. The method further includes determining the neural network as a function of the (Continued)

input training data and the output training data, and storing the determined neural network as a pre-trained neural network.

18 Claims, 3 Drawing Sheets

(56)                    References Cited

FOREIGN PATENT DOCUMENTS

| | | | |
|---|---|---|---|
| DE | 102017213771 A1 | 2/2019 | |
| DE | 102018219760 A1 | 5/2020 | |
| WO | WO-2020208639 A2 * | 10/2020 | ........... G06F 18/214 |

OTHER PUBLICATIONS

Stewart, Neural Network Optimization, pp. 1-41, (Year: 2019).*
Raschka, Python Machine Learning, 3rd Ed. Chapter 12, pp. 1-62, Dec. 2019 (Year: 2019).*
International Search Report corresponding to International Patent Application No. PCT/EP2021/058394, dated Jun. 11, 2021 (4 pages).
German Search Report corresponding to German Patent Application No. 10 2020 116 054.2, dated May 18, 2021 (7 pages).

* cited by examiner

METHOD, DEVICE, COMPUTER PROGRAM, AND COMPUTER-READABLE STORAGE MEDIUM FOR DETERMINING A NEURAL NETWORK AND FOR OPERATING A VEHICLE

The present application is the U.S. national phase of PCT Application No. PCT/EP2021/058394, filed on Mar. 31, 2021, which claims priority of German patent application No. 10 2020 116 054.2, filed on Jun. 18, 2020, which is incorporated herein by reference in its entirety.

TECHNICAL FIELD

The present disclosure relates to a method, device, computer program, and storage medium for determining a neural network. The present disclosure further relates to a method, device, computer program, and storage medium for operating a vehicle.

BACKGROUND

A vehicle may comprise a vehicle bus that is configured to transmit data and/or messages. If the bus load of the vehicle bus is too high, it may not be possible to transmit data and/or messages that are to be transmitted via the vehicle bus. For example, a so-called cycle time violation may occur. This may result in a safety-critical fault with respect to the vehicle and/or a fault with respect to the vehicle that is perceptible to a user of the vehicle. As a result, a state when operating the vehicle may deviate from a target state when operating the vehicle.

One object is to provide a method that contributes to the safe as well as comfortable operation of a vehicle. In addition, a corresponding device, a corresponding computer program, and a computer-readable storage medium are to be provided.

SUMMARY

The object, as well as others, are achieved by means of the features of at least one embodiment described herein.

A first aspect is characterized by a method for determining a neural network that is configured to process temporal dependencies.

According to the first aspect, input training data are provided. The input training data comprise identification information of messages of a vehicle bus of a vehicle and information with respect to time intervals between the messages. The messages were transmitted via the vehicle bus in a first predetermined time period. Output training data are provided. The output training data are representative of a bus load of the vehicle bus in a second predetermined time period. The second predetermined time period is arranged temporally after the first predetermined time period. The neural network is determined as a function of the input training data and the output training data. The determined neural network is stored as a pre-trained neural network.

By means of the method according to the first aspect, it is possible to determine the neural network in such a way that the bus load of the vehicle bus in the second predetermined time period can be predicted.

The neural network that is configured to process temporal dependencies is for example a feedback neural network.

The input training data and/or the output training data may be determined and/or provided as a function of historical data (so-called naturalistic data) that have been determined from one or more vehicles. The vehicle according to the first aspect is one of these vehicles. For example, the one or the several vehicles are part of a vehicle fleet. For example, the one or the several vehicles are so-called development vehicles that are configured to record the historical data. For example, the historical data comprise trace data that are representative of a recording or several recordings of a respective vehicle bus communication of the one or the several vehicles. A trace comprises a chronological sequence of messages that have been transmitted via a vehicle bus of the respective vehicle, as well as transmission instants associated with the messages. A transmission instant associated with a respective message may also be referred to as a time stamp of the respective message.

As a result, it is possible to determine the neural network efficiently and precisely. This is advantageous for example with respect to a method in which the input training data and/or the output training data are determined as a function of a simulation.

A respective piece of identification information of a respective message is representative of a type of message. Furthermore, the respective piece of identification information is unique. Optionally, the respective piece of identification information may be representative of a priority of the respective message with respect to the transmission via the vehicle bus.

The vehicle bus may comprise any vehicle bus of the vehicle, for example a CAN (controller area network) bus and/or a FlexRay bus and/or a MOST (media-oriented systems transport) bus and/or a bus based on Ethernet and/or a LIN (local interconnect network) bus, or the like. The vehicle bus may also be referred to as a vehicle bus system.

For example, in the case of a CAN bus, the identification information of the messages of the vehicle bus corresponds to the so-called frame IDs of the messages. A frame ID is representative of a numerical value that is associated with a message. For example, a low numerical value of the frame ID is representative of a high priority with respect to the transmission of the message associated with the frame ID via the CAN bus. For example, in the case of other vehicle buses, the identification information of the messages of the vehicle bus may correspond to several data fields of the messages.

For example, the information with respect to the time intervals between the messages is information with respect to time intervals between the transmission instants and/or emission instants and/or reception instants of the respective messages.

For example, the second predetermined time period is arranged temporally directly after the first predetermined time period.

The bus load of the vehicle bus in the second predetermined time period is representative of a number of messages transmitted via the vehicle bus in the second predetermined time period. For example, the output training data are representative of several busloads of the vehicle bus, wherein a respective one of the several bus loads is associated with an instant of the second predetermined time period. Additionally or alternatively, the bus load of the vehicle bus in the second predetermined time period is representative of a bus load rate. The bus load rate can have a value from 0 to 100 percent. For example, the bus load rate is determined with respect to a maximum bus load of the vehicle bus. The maximum bus load of the vehicle bus in the second predetermined time period is representative of a maximum number of messages that can be transmitted via the vehicle bus in the second predetermined time period. A bus load rate of 100 percent is representative of the bus load corresponding to the maximum bus load.

According to an optional embodiment of the first aspect, the neural network that is configured to process temporal dependencies is a recurrent neural network (RNN) and/or a long short-term memory (LSTM) neural network and/or a gated recurrent unit (GRU) neural network.

Neural networks that are configured to process temporal dependencies are for example recurrent neural networks (RNNs) and/or long short-term memory (LSTM) neural networks and/or neural networks with a so-called gated recurrent unit (GRU), or the like.

Alternatively, the neural network is a convolutional neural network (CNN).

As a result, it is possible to determine the neural network efficiently and precisely. Furthermore, as a result, the time dependency of input data of the neural network can be taken into account in the determination of output data by the neural network. For example, the neural network with the so-called gated recurrent unit (GRU) is particularly advantageous in this context.

According to a further optional embodiment of the first aspect, the neural network is determined as a function of an optimization method.

The optimization method may also be referred to as a training method.

The optimization method may comprise any optimization method or any optimization algorithm for neural networks, for example a so-called Adam optimization algorithm and/or a stochastic gradient descent (SGD) optimization method and/or a so-called RMSprop optimization method, or the like.

The neural network may also be determined as a function of several optimization methods.

As a result, it is possible to determine the neural network efficiently and precisely.

According to another optional embodiment of the first aspect, the first predetermined time period comprises a time period between 10 and 100 ms, and the second predetermined time period comprises a time period between 1 and 10 ms.

As a result, it is possible to determine the neural network efficiently and precisely.

In particular, the first predetermined time period comprises a time period of 60 ms. In particular, the second predetermined time period comprises a time period of 4 ms.

A second aspect is characterized by a method for operating a vehicle.

According to the second aspect, a pre-trained neural network is provided that is configured to process temporal dependencies. Depending on the vehicle bus of the vehicle, input data are provided to the pre-trained neural network. The input data comprise identification information of messages of a vehicle bus of the vehicle and information with respect to time intervals between the messages. The messages were transmitted via the vehicle bus in a first predetermined time period. A bus load of the vehicle bus is determined in a second predetermined time period as a function of the input data and the pre-trained neural network. The second predetermined time period is arranged temporally after the first predetermined time period. The vehicle is operated as a function of the determined bus load in the second predetermined time period.

For example, the provided pre-trained neural network is the stored pre-trained neural network according to the first aspect and/or optional embodiments thereof.

For example, the vehicle according to the second aspect is different from the vehicle according to the first aspect. Alternatively, the vehicle according to the second aspect may correspond to the vehicle according to the first aspect.

By means of the method according to the second aspect, it is possible to predict the bus load in the second predetermined time period. Thus, the bus load can be determined before for example a measurement of the bus load can take place. This is for example advantageous with respect to a retroactive determination and/or measurement of the bus load, which may require high computing effort and/or may be complex to determine. Furthermore, in this case, a high bus load can be detected only after or when it occurs, and thus an error triggered by it cannot be prevented.

The determination of such a prediction of the bus load can be used to detect an error when operating the vehicle. As a result, it is possible to contribute to the prevention of errors when operating the vehicle, thus increasing the vehicle's road safety. Furthermore, satisfaction of a user of the vehicle may thereby be increased. Furthermore, user comfort when operating the vehicle may thereby be increased.

Such an error when operating the vehicle may occur for example if a message is not transmitted or is transmitted too late (so-called "cycle time violation") via the vehicle bus. As a further consequence, for example a vehicle function that is to be executed as a function of this message cannot be executed properly. This may be the case in particular if several messages that are to be transmitted via the vehicle bus at the same instant have the same priority with respect to their transmission via the vehicle bus, and/or the bus load of the vehicle bus is already high (so-called "bus load peak") with respect to a maximum bus load of the vehicle bus.

The method according to the second aspect is executed for example in the vehicle in real time at a time to. In this case, the first predetermined time period is representative of instants that are arranged temporally before $t_0$, for example instants $t-1$, $t-2$, $t-3$, or the like. In addition, the first predetermined time period may include the instant $t_0$. The second predetermined time period in this case is representative of instants that are arranged temporally after $t_0$, such as instants $t+1$, $t+2$, $t+3$, or the like.

The first predetermined time period and/or the second predetermined time period according to the second aspect may have the same properties as the first predetermined time period and/or the second predetermined time period according to the first aspect.

The vehicle bus, the identification information, the information with respect to time intervals between the messages, and the bus load according to the second aspect may have the same characteristics as the vehicle bus, the piece of identification information, the information with respect to time intervals between the messages, and the bus load according to the first aspect.

For example, the vehicle is operated as a function of the determined bus load in the second predetermined time period and a predetermined bus load limit value and/or the maximum bus load. The predetermined bus load limit value is representative of a value of the bus load at which no error occurs with respect to the operation of the vehicle and/or at which an effect of the error with respect to the operation of the vehicle is minimal.

For example, operating the vehicle as a function of the determined bus load comprises a bus load analysis. The bus load analysis may be configured to determine a piece of information that is representative of a cause of the determined bus load. The bus load analysis may comprise a method for interpretable machine learning.

According to an optional embodiment of the second aspect, the input data is provided iteratively as a function of the vehicle bus when a further message is transmitted via the vehicle bus.

As a result, it is possible to determine the prediction of the bus load without gaps.

For example, a respective further message is transmitted via the vehicle bus in a range of one to a few milliseconds.

According to a further optional embodiment of the second aspect, the vehicle is operated as a function of the determined bus load in such a way that a bus node of the vehicle bus is determined in order to adjust the transmission of messages via the vehicle bus by means of the bus node, as a function of the determined bus load.

As a result, it is possible to contribute to the prevention of the error when operating the vehicle, whereby road safety of the vehicle is increased. Furthermore, as a result, it is possible to increase the satisfaction of the vehicle user. Furthermore, as a result, it is possible to increase user comfort when operating the vehicle.

For example, the bus node is determined as a function of the determined bus load and/or the predetermined bus load limit value and/or the maximum bus load.

For example, adjusting the transmission of messages via the vehicle bus by means of the bus node comprises determining a control command that is representative of the adjustment of the transmission of messages via the vehicle bus by means of the bus node. The control command can be provided to the bus node. Additionally or alternatively, the bus node may be muted with respect to the vehicle bus, as a function of the control command. Muting the bus node with respect to the vehicle bus is representative of the bus node for example not being able to transmit a further message via the vehicle bus.

Such muting of the bus node may occur for example for the second predetermined time period and/or for predetermined instants of the second predetermined time period and/or for a third predetermined time period, or the like.

Additionally or alternatively, the adjustment of the transmission of messages via the vehicle bus by means of the bus node comprises adjusting the piece of identification information of one or several messages that may be transmitted by means of the bus node. In particular, a type of the respective message and/or a priority of the respective message with respect to the transmission via the vehicle bus may be adjusted. For example, this may take place as a function of the bus load analysis.

The bus node is for example a control unit of the vehicle and/or a sensor of the vehicle and/or an actuator of the vehicle, or the like.

For example, several bus nodes of the vehicle bus may also be determined in order to adjust the transmission of messages via the vehicle bus by means of the respective bus nodes.

A third aspect is characterized by a device, wherein the device is configured to carry out the method for determining a neural network and/or an optional embodiment of the method for determining a neural network and/or the method for operating a vehicle and/or an optional embodiment of the method for operating a vehicle.

A fourth aspect is characterized by a computer program, wherein the computer program comprises instructions that, when the computer program is executed by a computer, cause the computer to carry out the method for determining a neural network and/or an optional embodiment of the method for determining a neural network and/or the method for operating a vehicle and/or an optional embodiment of the method for operating a vehicle.

A fifth aspect is characterized by a computer-readable storage medium on which the computer program according to the fourth aspect is stored.

Optional embodiments of the first aspect may also be correspondingly present in the further aspects and may have corresponding effects.

For example, the method according to the first aspect and optional embodiments thereof and/or the method according to the second aspect and optional embodiments thereof may be applied analogously to other fields of application, for example to predict data traffic in any network and/or a data center and to determine corresponding actions at an early stage.

The method according to the first aspect and optional embodiments thereof and/or the method according to the second aspect and optional embodiments thereof may be carried out independently of a bus specification of the vehicle bus and/or independently of a message specification of the messages.

The method according to the first aspect and optional embodiments thereof and/or the method according to the second aspect and optional embodiments thereof may be applied analogously to future vehicle buses or a bus system not mentioned herein.

Exemplary embodiments are explained in greater detail below with reference to the schematic drawings.

DETAILED DESCRIPTION

Elements of the same design or function are identified by the same reference signs across all figures.

Figure 1:
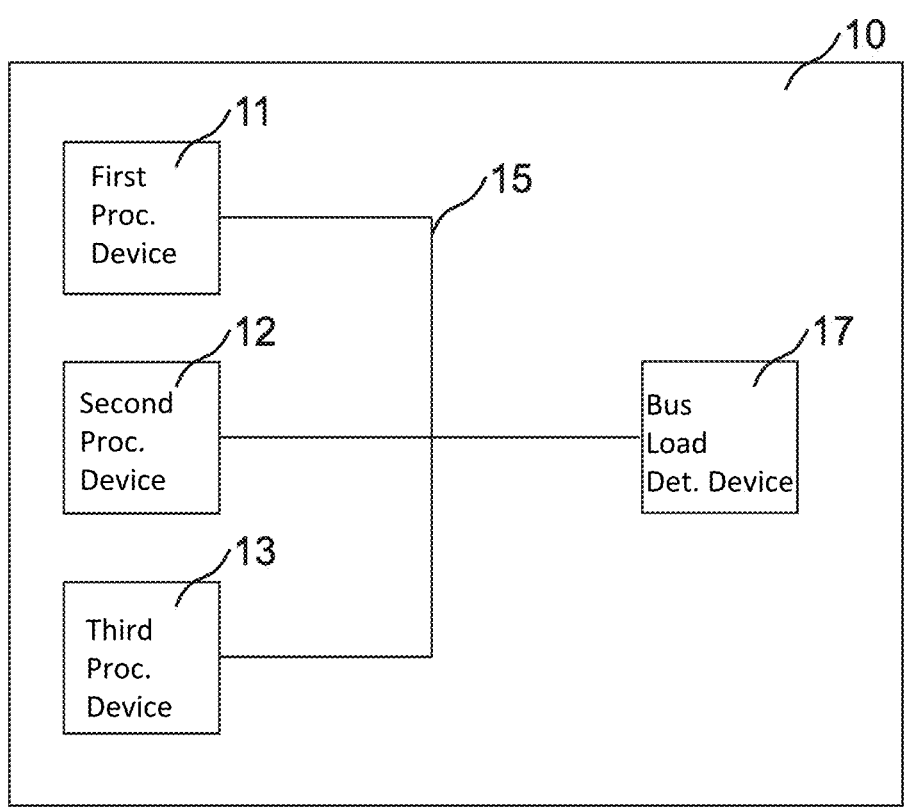
FIG. 1 shows a schematic drawing of a distributed system.

FIG. 1 shows a schematic drawing of a distributed system. The distributed system comprises a vehicle 10.

The vehicle 10 comprises a first processing device 11. The first processing device 11 comprises for example a first control unit of the vehicle 10 and/or a first sensor of the vehicle 10 and/or a first actuator of the vehicle 10, or the like.

Furthermore, the vehicle 10 comprises a second processing device 12. The second processing device 12 comprises for example a second control unit of the vehicle 10 and/or a second sensor of the vehicle 10 and/or a second actuator of the vehicle 10, or the like.

Furthermore, the vehicle 10 comprises a third processing device 13. The third processing device 13 comprises for example a third control unit of the vehicle 10 and/or a third sensor of the vehicle 10 and/or a third actuator of the vehicle 10, or the like.

Furthermore, the vehicle 10 comprises a vehicle bus 15. The vehicle bus 15 may comprise any vehicle bus of the vehicle 10, for example a CAN (controller area network) bus and/or a FlexRay bus and/or a MOST (media-oriented systems transport) bus and/or a bus based on Ethernet and/or a LIN (local interconnect network), or the like.

Furthermore, the vehicle 10 comprises a device 17. For example, the device 17 comprises a pre-trained neural network and is configured to determine a bus load of the vehicle bus 15 as a function of the pre-trained neural network. For example, identification information of messages of the vehicle bus 15 and information with respect to time intervals between the messages may be provided to the device 17 as a function of the vehicle bus 15.

The first processing device 11, the second processing device 12, the third processing device 13, and the device 17 are coupled in terms of signaling to each other via the vehicle bus 15. For example, the first processing device 11, the second processing device 12, the third processing device 13, and the device 17 comprise corresponding communication interfaces for this purpose.

The first processing device 11 and/or the second processing device 12 and/or the third processing device 13 are configured to transmit or receive messages via the vehicle bus 15. The first processing device 11 and/or the second processing device 12 and/or the third processing device 13 may also be referred to as bus nodes.

Figure 2:
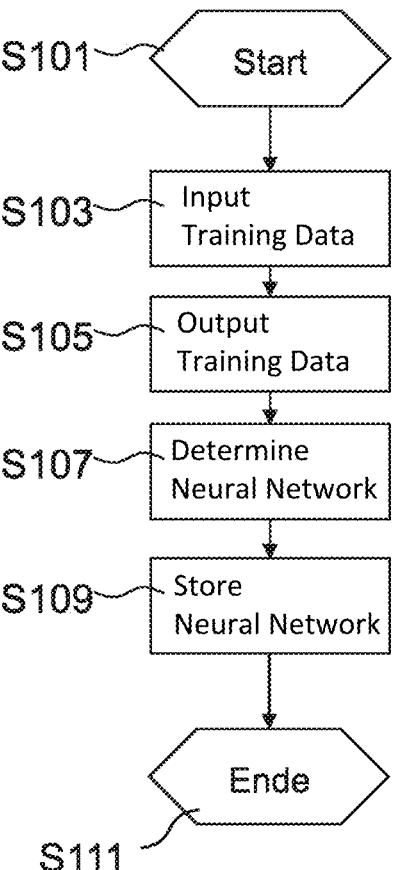
FIG. 2 shows a flowchart of a first program for determining a neural network that is configured to process temporal dependencies.

FIG. 2 shows a flowchart of a first program for determining a neural network that is configured to process temporal dependencies.

The first program may be executed in particular by a first device. For this purpose, the first device comprises in particular a first computing unit, a first program memory and a first data memory, and for example one or several first communication interfaces. The first program memory and first data memory and/or the first computing unit and/or the first communication interfaces may be configured in one assembly unit and/or distributed across several assembly units. The first device is for example the device 17.

For this purpose, in particular the first program is stored in the first program memory and the first data memory of the first device.

The first program is started in a step S101, in which variables can be initialized if necessary.

In a step S103, input training data are provided. The input training data comprise identification information of messages of a vehicle bus of a vehicle and information with respect to time intervals between the messages. The messages were transmitted via the vehicle bus in a first predetermined time period.

Optionally, in step S103, the first predetermined time period comprises a time period between 10 and 100 ms.

For example, the first predetermined time period comprises a time period of 60 ms.

In a step S105, output training data are provided. The output training data are representative of a bus load of the vehicle bus in a second predetermined time period. The second predetermined time period is arranged temporally after the first predetermined time period.

Optionally, in step S105, the second predetermined time period comprises a time period between 1 and 10 ms.

For example, the second predetermined time period comprises a time period of 4 ms.

In a step S107, the neural network that is configured to process temporal dependencies is determined as a function of the input training data and the output training data.

Optionally, in step S107, the neural network that is configured to process temporal dependencies is a recurrent neural network (RNN) and/or a long short-term memory (LSTM) neural network and/or a gated recurrent unit (GRU) neural network.

Optionally, in step S107, the neural network is determined as a function of an optimization method.

8

For example, the optimization method is a so-called Adam optimization algorithm.

In a step S109, the determined neural network is stored as a pre-trained neural network.

Following step S109, the first program is terminated in step S111 and can be restarted in step S101 if necessary.

Figure 3:
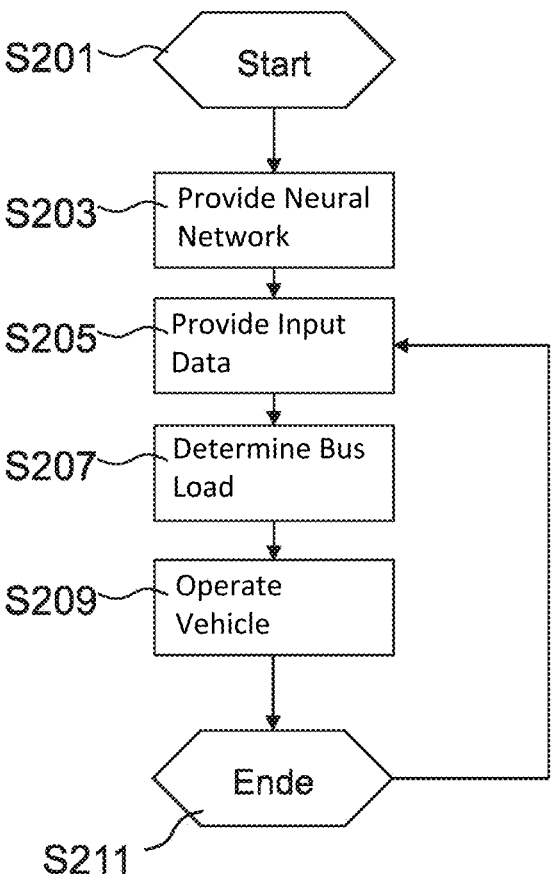
FIG. 3 shows a flowchart of a second program for operating a vehicle.

FIG. 3 shows a flowchart of a second program for operating a vehicle 10.

In particular, the second program may be executed by a second device. For this purpose, the second device comprises in particular a second computing unit, a second program memory and a second data memory, and for example one or several second communication interfaces. The second program memory and second data memory and/or the second computing unit and/or the second communication interfaces may be configured in one assembly unit and/or distributed across several assembly units.

For example, the second device is the device 17.

For this purpose, the second program is in particular stored in the second program memory and the second data memory of the second device.

The second program is started in a step S201, in which variables can be initialized if necessary.

In a step S203, a pre-trained neural network is provided that is configured to process temporal dependencies.

In a step S205, input data for the pre-trained neural network is provided as a function of the vehicle bus 15 of the vehicle 10. The input data comprise identification information of messages of a vehicle bus 15 of the vehicle 10 and information with respect to time intervals between the messages. The messages were transmitted via the vehicle bus 15 in a first predetermined time period.

Optionally, in step S205, the input data are provided iteratively as a function of the vehicle bus 15 when a further message is transmitted via the vehicle bus 15.

In a step S207, a bus load of the vehicle bus 15 is determined in a second predetermined time period as a function of the input data and the pre-trained neural network. The second predetermined time period is arranged temporally after the first predetermined time period.

In a step S209, the vehicle 10 is operated as a function of the determined bus load in the second predetermined time period.

Optionally, in step S209, the vehicle 10 is operated as a function of the determined bus load in such a way that a bus node of the vehicle bus 15 is determined as a function of the determined bus load, in order to adjust the transmission of messages via the vehicle bus 15 by means of the bus node.

For example, the bus node is determined as a function of the determined bus load and a predetermined bus load limit value.

For example, the determined bus node is the first processing device 11.

For example, a control command is determined that is representative of the adjustment of the transmission of messages via the vehicle bus 15 by means of the bus node.

For example, the control command is provided to the bus node and the bus node is muted with respect to the vehicle bus 15 as a function of the control command.

Following step S209, the first program is terminated in step S211 and can be restarted in step S201 or step S205 if necessary.

The invention claimed is:

1. A method for determining a neural network that is configured to process temporal dependencies, the method comprising:

providing input training data that comprises identification information of messages of a vehicle bus of a vehicle and information with respect to time intervals between the messages, wherein the messages were transmitted in a first predetermined time period via the vehicle bus, providing output training data that is representative of a bus load of the vehicle bus in a second predetermined time period, wherein the second predetermined time period is arranged temporally after the first predetermined time period, determining the neural network as a function of the input training data and the output training data, and storing the determined neural network as a pre-trained neural network;

determining a bus load of the vehicle as a function of the pre-trained neural network; and operating the vehicle as a function of the determined bus load, wherein the bus load comprises a bus load rate.

2. The method as claimed in claim 1, wherein the determined neural network is a recurrent neural network (RNN) and/or a long short-term memory (LSTM) neural network and/or a gated recurrent unit (GRU) neural network.

3. The method as claimed in claim 2, wherein determining the neural network further comprises determining the neural network as a function of an optimization method.

4. The method as claimed in claim 1, wherein determining the neural network further comprises determining the neural network as a function of an optimization method.

5. The method as claimed in claim 1, wherein the first predetermined time period comprises a time period between 10 and 100 ms, wherein the second predetermined time period comprises a time period between 1 and 10 ms.

6. The method as claimed in claim 5, wherein the determined neural network is a recurrent neural network (RNN) and/or a long short-term memory (LSTM) neural network and/or a gated recurrent unit (GRU) neural network.

7. The method as claimed in claim 6, wherein determining the neural network further comprises determining the neural network as a function of an optimization method.

8. A device that is configured to carry out the method as claimed in claim 1.

9. A computer program stored in a memory, wherein the computer program comprises instructions that, when the program is executed by a processor of a computer, cause the computer to carry out the method as claimed in claim 1.

10. A non-transitory computer-readable storage medium on which the computer program as claimed in claim 9 is stored.

11. The method of claim 1, wherein operating the vehicle as a function of the determined bus load is performed such that a bus node of the vehicle bus is determined as a function of the determined bus load.

12. The method of claim 11, wherein operating the vehicle as a function of the determined bus load and determining the bus node of the vehicle as a function of the determined bus load is performed in order to adjust transmission of messages via the vehicle bus by means of the bus node.

13. A method for operating a vehicle, the method comprising:

providing a pre-trained neural network, the pre-trained neural network configured to process temporal dependencies, providing input data for the pre-trained neural network as a function of a vehicle bus of the vehicle, wherein the input data comprises identification information of messages of the vehicle bus of the vehicle and information with respect to time intervals between the messages, wherein the messages were transmitted in a first predetermined time period via the vehicle bus, determining a bus load of the vehicle bus in a second predetermined time period as a function of the input data and the pre-trained neural network, wherein the second predetermined time period is arranged temporally after the first predetermined time period, and operating the vehicle in the second predetermined time period as a function of the determined bus load such that a bus node of the vehicle bus is determined as a function of the determined bus load, in order to adjust transmission of messages via the vehicle bus by means of the bus node, wherein the bus load comprises a bus load rate.

14. The method as claimed in claim 13, further comprising providing the input data iteratively as a function of the vehicle bus when a further message is transmitted via the vehicle bus.

15. The method as claimed in claim 13, wherein the pre-trained neural network is a recurrent neural network (RNN) and/or a long short-term memory (LSTM) neural network and/or a gated recurrent unit (GRU) neural network.

16. A device that is configured to carry out the method as claimed in claim 13.

17. A computer program stored in a memory, wherein the computer program comprises instructions that, when the program is executed by a processor of a computer, cause the computer to carry out the method as claimed in claim 13.

18. A non-transitory computer-readable storage medium on which the computer program as claimed in claim 17 is stored.

\* \* \* \* \*